United States Patent
Kimura et al.

(10) Patent No.: US 7,100,990 B2
(45) Date of Patent: Sep. 5, 2006

(54) SEAT BACK STRUCTURE OF VEHICLE SEAT

(75) Inventors: Toshimitsu Kimura, Tokyo (JP); Harutoshi Fujii, Tokyo (JP)

(73) Assignee: Tachi-S Co. Ltd., Tokyo (JP)

( * ) Notice: Subject to any disclaimer, the term of this patent is extended or adjusted under 35 U.S.C. 154(b) by 345 days.

(21) Appl. No.: 10/689,725

(22) Filed: Oct. 22, 2003

(65) Prior Publication Data

US 2005/0088022 A1    Apr. 28, 2005

(51) Int. Cl.
  *A47C 7/02*    (2006.01)
  *A47B 85/04*   (2006.01)
  *B60N 2/22*    (2006.01)

(52) U.S. Cl. .............. 297/452.55; 297/125; 297/378.1; 297/452.56

(58) Field of Classification Search ............. 297/378.1, 297/219.1, 452.15, 452.14; 5/630, 633, 652; 296/65.06
See application file for complete search history.

(56) References Cited

U.S. PATENT DOCUMENTS 3,233,885 A * 2/1966 Propst .................. 297/452.15
5,669,661 A * 9/1997 Pajon .................... 297/216.13
6,256,819 B1 * 7/2001 Maier et al. ................... 5/653

FOREIGN PATENT DOCUMENTS

JP    2002-127798    5/2002

* cited by examiner

*Primary Examiner*—Peter M. Cuomo
*Assistant Examiner*—Tania Abraham
(74) *Attorney, Agent, or Firm*—Browdy and Neimark, PLLC

(57) ABSTRACT

A structure of seat back in vehicle seat, wherein a back board element is provided the said backward side of the seat back in such a manner as to normally provide a substantially flat plane rigid enough to withstand one load applied toward a backward side of the back board element, thereby to allow the back board element to be usable as a means for carrying load and cargo thereon, while being resiliently deformable in a backward direction of the vehicle seat by another load applied toward a seat occupant's back support side of said seat back. A plurality of crevices may be defined properly in one side of the back board element so as to effectively permit the back board element to be either in the substantially flat state or in a resiliently deformable state.

12 Claims, 9 Drawing Sheets

SEAT BACK STRUCTURE OF VEHICLE SEAT

BACKGROUND OF THE INVENTION

1. Field of the Invention

The present invention relates to a structure of seat back of a vehicle seat, wherein the seat back is provided, at the back side thereof, with a back board which can serve as a load-carrying platform or cargo loading area in a vehicle.

2. Description of Prior Art

Among various kinds of seats, there is known a fold-down rear seat of the type allowing its seat back to be foldable onto its seat cushion, thereby allowing the back side of the seat back to be transformed into a load-carrying platform area in a cabin section or a cargo loading section in a vehicle cabin, as found in a recreational vehicle, a mini-van, a station wagon, a small-sized vehicle, or the like.

In most cases, this sort of fold-down rear seat is provided with a back board at the back side thereof. One typical example of such back board is known from the Japanese Laid-Open Patent Publication No. 2000-125796, according to which, one piece of robust flat panel having a high rigidity is disclosed.

Normally, a cabin or a cargo loading section in vehicle, which can accommodate the fold-down rear seat of the foregoing type, requires formation of a storage space in the floor so as to allow both of seat cushion and seat back of the seat to be stored in that storage space, such that, when the seat back is folded down onto the seat cushion, the back side of the seat back is set in registry with the upper surface of the floor. In view of such structural requirement, it is desirable that a whole of the seat, or, particularly the seat back, should be made small in thickness. Particularly, the same goes for a small-sized vehicle.

To meet this demand, it would be necessary to reduce the thickness of foam padding (i.e. a cushion body) in the seat back so as to provide a relatively thin seat back. However, when it comes to attaching the foregoing conventional rigid back board to the back side of such thin seat back, a degree of elasticity of the padding will be limited by the rigid back board, resulting in a poor cushioning effect of the padding. In other words, a passenger resting on the seat back will feel, at his or her back, the hardness of the back board, due to the reduced thickness of the padding in the seat back, with the result that a comfortable seating touch is not attained.

SUMMARY OF THE INVENTION

In view of the above-stated drawbacks, it is therefore a primary purpose of the present invention to provide an improved structure of seat back in vehicle seat, which can be used as a load-carrying platform without reducing its cushiony effect as a seat.

In order to achieve such purpose, in accordance with the present invention, there is basically provided a structure of seat back in vehicle seat, in which the seat back has a seat occupant's back support side facing in a direction forwardly of the vehicle seat to supportively receive a back of an occupant on the vehicle seat and a backward side facing in a direction backwardly of the vehicle seat, comprising:

a back board means provided in the backward side of the vehicle seat, the backboard means having a forward side facing to the forward side of the seat back and a backward side corresponding to the backward side of the seat back;

the back board means being so arranged as to provide a substantially flat plane rigid enough to withstand a first load applied toward the backward side of the back board means, thereby to allow the back board means to be usable as a means for carrying load and cargo thereon, while being resiliently deformable in the backward direction of the vehicle seat by a second load applied toward the seat occupant's back support side of seat back.

Preferably, the back board means may comprise a back board formed from a hard yet elastically deformable material, the back board including a means for defining therein a plurality of crevices in substantially grid fashion, with such an arrangement that the crevices are normally closed so as to retain the back board in a substantially flat state, while being openable when the second load is applied to the back board, thereby allowing the back board to be resiliently deformed in the backward direction of the vehicle seat.

It is another purpose of the present invention to provide an improved structure of seat back in vehicle seat, which not only permit its use as a load-carrying platform, but also permits a reduced thickness thereof, while retaining a high cushiony effect as a seat.

For that purpose, based on the above-described first mode of the invention, the structure of seat back may be basically comprised of:

a seat back frame provided therein;

a back board means provided in the backward side of the vehicle seat, the back board means having: a forward side facing to the forward side of the seat back; and a backward side corresponding to the backward side of the seat back;

the back board means being so arranged as to provide a substantially flat plane rigid enough to withstand a forward load applied toward the backward side of the back board means, thereby to allow the back board means to be usable as a means for carrying load and cargo thereon, while being resiliently deformable in the backward direction of the vehicle seat by a second load applied toward the seat occupant's back support side of seat back;

a biasing means provided in the seat back frame, the biasing means being adapted to biasingly cause said back board means to expand flatly so as to provide said substantially flat plane; and a stopper means for receiving and preventing the back board means against movement toward the forward side of the vehicle seat.

In this mode, preferably, the back board means may include a means for defining a plurality of crevices therein, with such an arrangement that the plurality of crevices are normally closed under a biasing force of said biasing means so as to retain the back board means in the substantially flat state, while being openable when the second load is applied to the back board, thereby allowing the back board to be resiliently deformed in the backward direction of the vehicle seat.

Other various features and advantages will become apparently from reading of the description and appended claims, with reference to the accompanied drawings.

DETAILED DESCRIPTION OF PREFERRED EMBODIMENT OF THE INVENTION

Figure 1:
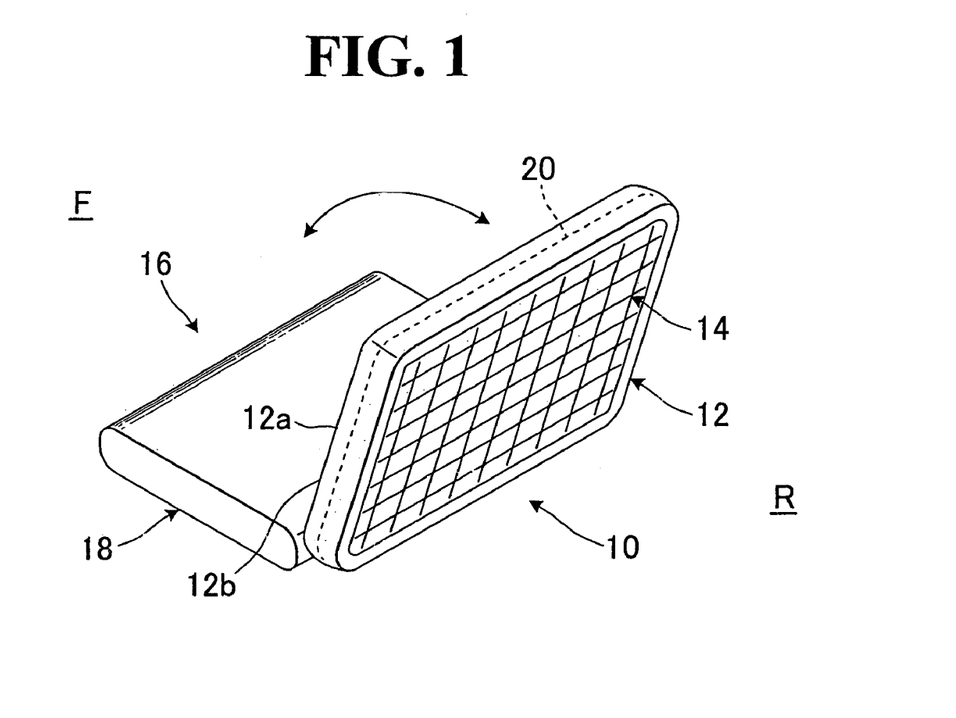
FIG. 1 is a perspective view of a vehicle seat provided with a structure of seat back of the present invention.
Figure 2:
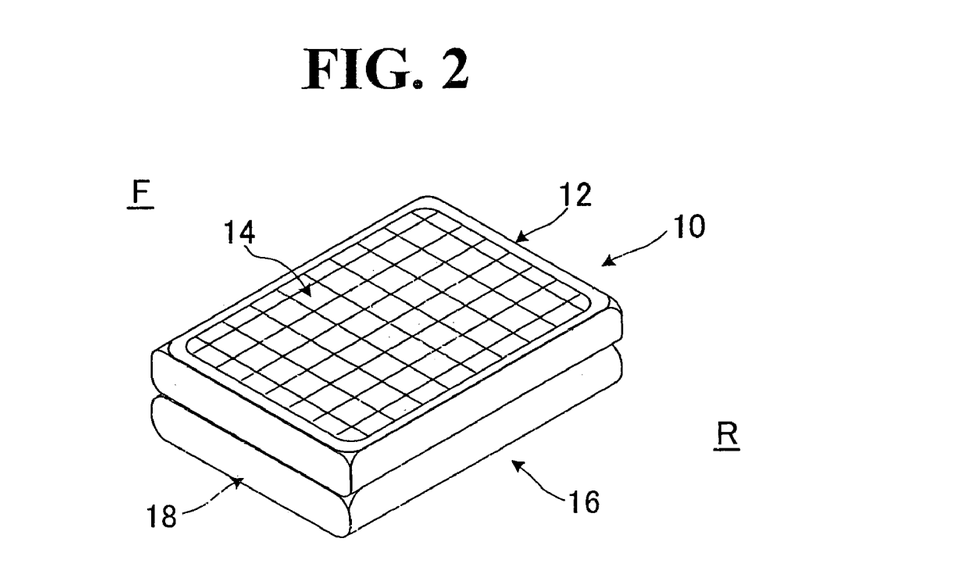
FIG. 2 is a perspective view of the vehicle seat, which shows the seat back thereof as being folded down onto the seat cushion thereof.

As shown in FIGS. 1 and 2, generically stated, the present invention provides a structure of seat back, generally designated by (10), in a vehicle seat (16). The illustrated vehicle seat (16) is of a well-known fold-down type comprising a seat cushion (18) and a seat back (12) pivotally connected with the seat cushion (18), such that the seat back (12) may be rotated or flipped over in the forward and backward directions as indicated by the arrow in FIG. 1. Hence, as indicated in FIG. 2, the seat back (12) can be folded down onto the seat cushion (18), in which case, the back side of the seat back (12) will be exposed outwardly and will serve as a load-carrying platform in a vehicle cabin or cargo loading section in vehicle (not shown). In general, as seen from FIGS. 1 and 4, the seat back (12) is formed by a seat back frame (20), a trim cover assembly (12b), a foam padding (22), and a back board means (14) which forms a principal part of the present invention as will be elaborated later. In brief, as shown, the seat back frame (20) is of a generally rectangular shape, forming a typical rectangular contour of the seat back (12), and the trim cover assembly (12b) is secured at the four sides thereof to the corresponding four sides of the seat back frame (20) so as to cover a forward side of the padding (22), while the back board means (14) is secured at the four sides thereof to the corresponding four sides of seat back frame (20) so as to cover a backward side of the padding (22). Designation (12a) denotes a frontal surface or a seat occupant's back support side of the trim cover assembly (12b) which normally faces in the forward direction (i.e. to the side (F)) and is an area adapted to support the back of an occupant on the seat (16).

It is noted that, throughout the description, hereinafter, the wording "forwardly" or the wording "forward direction" shall refer to a direction toward a forward side (F) of the seat (16), whereas the wording "backwardly" or the wording "backward direction" shall refer to a direction toward a backward side (R) of the seat (16).

In accordance with the seat back structure (10) of the present invention, the back side of the seat back (12) is provided with a novel back board means generally designated by (14), which can provide a substantially horizontal support plane retained against movement in one direction, thereby allowing its use as a robust and flat load-carrying platform, and can also provide flexure or yielding in another direction opposite to that one direction, thereby allowing the back board means (14) per se to be deformable in conformity with a shape of the back of passenger resting thereon.

At first, it should be understood that, in FIGS. 3 to 18, four exemplary embodiments of the foregoing back board means (14) are suggested within the gist and scopes of the present invention, and that they are not limitative, but may be embodied in any other fashion within the scopes and purposes of the present invention. Namely, the first, second, third and fourth embodiments are respectively shown in one set of FIGS. 3 to 5, one set of FIGS. 6 to 10, one set of FIGS. 11 to 14, and one set of FIGS. 15 to 18. As clearly conceivable from those figures, a common inventive concept given in the four embodiments, by way of example, is to define a plurality of crevices in a body of back board in a grid fashion, as can be generically seen from the back board means (14) in FIG. 1, so as to realize the above-mentioned actions and effects of back board.

Figure 3:
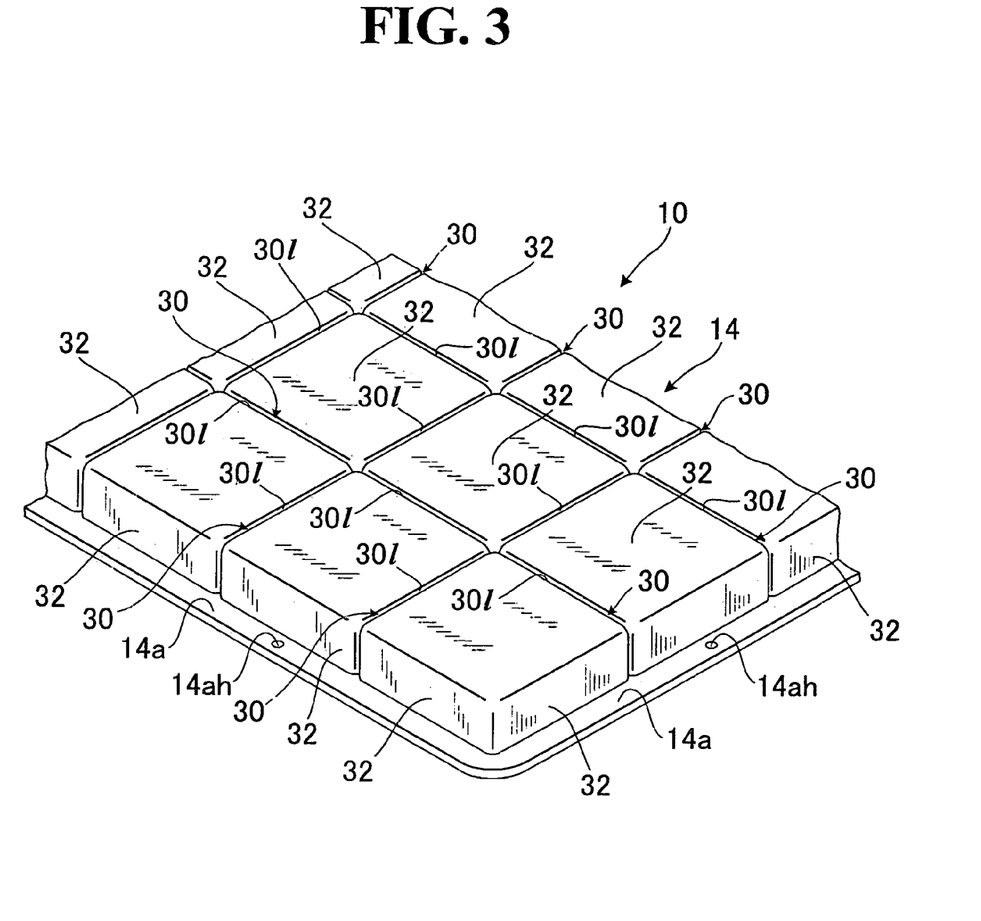
FIG. 3 is partly broken perspective view showing one exemplary mode of back board in a first embodiment of the structure of seat back.
Figure 4:
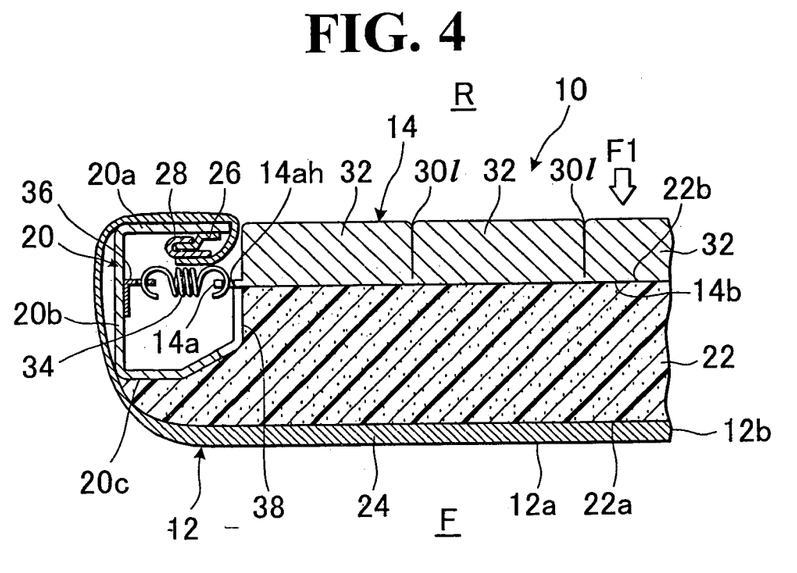
FIG. 4 is a fragmentary sectional view showing a principal part of the first embodiment of seat back structure, which depicts the back board to be retained in a flat state against a load.
Figure 5:
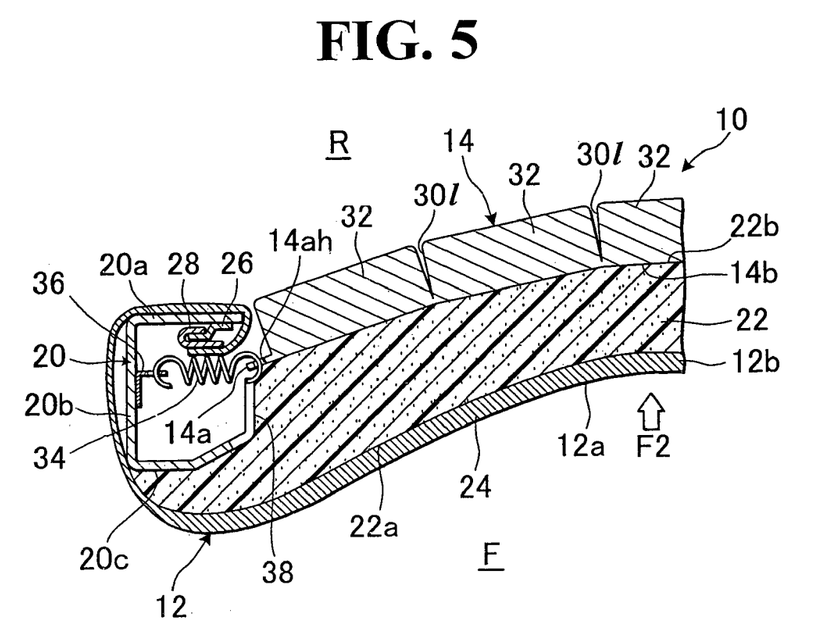
FIG. 5 is a fragmentary sectional view showing a principal part of the first embodiment of seat back structure, which depicts the back board to be resiliently deformed by a backward load.

Reference is now made to a first embodiment shown in FIGS. 3 to 5. According thereto, as shown in FIG. 3, the illustrated back board, which is also designated by (14) for the sake of simplicity, is formed by means of a suitable molding from a synthetic resin material into such configuration wherein a plurality of cubic protrusions (32) and a plurality of slits (30) are formed in one side of the back board (14), such that the slits (30) extend among the cubic protrusions (32). As observed from the FIGS. 3 to 5, those cubic protrusions (32) are formed in an orderly fashion in the flat plane of back board (14), such that all the cubic protrusions (32) are integral and continuous with one another via a flat plane of bottom (14b) of the back board (14). In other words, it is seen that an orderly grid pattern of plural crevices (30l) is defined among the adjoining cubic protrusions (32). As understandable from FIGS. 3 and 4, integrally formed in the peripheral ends of the back board (14) is a flange portion (14a) so as to project horizontally therefrom. The flange portion (14a) has a plurality of securing holes (14ah) formed therein, which will be described later.

With such arrangement, normally, as shown in FIGS. 3 and 4, a whole of the back board (14) assumes a flat plate extending on a flat plane and along a rectilinear line by virtue of the fact that all the orderly disposed cubic protrusions (32) are in contact with one another at their respective vertical side walls, thereby closing all the crevices (30l) tight.

As can be seen from the cross-section of FIGS. 4 and 5, the seat back frame (20), which surrounds the foam padding (22) to assume a contour of the seat back (12), is embedded partly in the foam padding (22) at one half portion thereof, whereas another half portion of the seat back frame (20) projects from the padding (22) in the backward direction. Thus, defined between that another half portion of seat back frame (20) and the foam padding (22) is a space for allowing the back board (14) to be mounted therein, though not clearly shown. But, it is to be understood that FIG. 4 shows the back board (14) to be mounted in Such Space defined between the seat back frame (20) and the foam padding (22). As shown, the seat back frame (20) is of a generally channel cross-section comprising a first wall portion (20b) facing outwardly thereof and a pair of second and third wall portions (20a) (20c), each extending from the first wall portion (20b) in a direction inwardly of the fame (20). Designation (36) denotes a spring securing lug fixed to the lateral wall portion (20b) of the seat back frame (20), and designation (26) denotes a trim cover assembly securing lug fixed to the second wall portion (20a) of the seat backframe (20).

Designation (38) stands for a stopper piece extending continuously and upwardly from the third wall portion (20c) of seat back frame (20). As illustrated, the upper end of the stopper piece (38) is in registry with the backward surface (22b) of foam padding (22).

It is noted here that a plurality of the foregoing lugs (36) (26) and stopper pieces (38) are provided, through not clearly shown, for a purpose to be set forth below.

While not shown completely, but as understandable from FIG. 4, the trim cover assembly (12b) has hook-like anchor members (28) fixed to the peripheral ends thereof, and, therefore, by engaging such hook-like anchor members (28) with the afore-said securing lugs (26), respectively, the trim cover assembly (12b) is stretched on and along the forward surface (22a) of the foam padding (22) and securely connected with the seat back frame (20). At this point, an incomplete seat back unit is produced, which, as noted above, has a space for allowing the back board (14) to be mounted therein, the space being defined between the exposed upper half portion of the seat back frame (20) and the horizontally extending flat backward surface (22b) of foam padding (22).

Subsequent thereto, while not shown completely, but as understandable from FIG. 4, at first, each of tension coil springs (34) is at one end thereof engaged with each of the spring securing lugs (36) fixed in the seat back frame (20), and secondly, another end of each of the tension coil springs (34) is engaged With each of the Securing holes (14ah) of back board flange portions (14a). By being so done, the back board (14) is resiliently stretched and supported by the tension coil springs (34) in all angles on the backward side of seat back (12) and therefore securely mounted on the flat backward surface (22b) of foam padding (22) and surrounded by the seat back frame (20). In other words, due to the outward biasing force caused by the contracting force of springs (34), all the cubic protrusions (32) are normally biased into contact with one another at their respective vertical side walls, with all the crevices (30l) thereamong being closed tight, as in FIG. 4, whereupon a whole of the back board (14) is retained in a uniformly expanding state or in the state of extending along a rectilinear line, thereby providing a flat plane. Otherwise stated, the back board (14) is in a normal plate-like state. Under such normal flat state, even when applied by a force or load (F1) (e.g. a weight of cargoes, luggage and the like) from the backward side of seat back (12), the back board (14) per se is rigid enough to withstand the load (F1) and does not yield thereto in a direction toward the side at (F). Further, since its flange portions (14a) rest against the upper ends of stopper piece (38), the back board (14) per se is positively prevented against movement toward the frontal Side (12a) of seat back (12). This also advantageously allows the load (F1) to be dispersed and transmitted via the flange portions (14a) to the seat back frame (20), thereby helping to prevent breakage and deformation of the back board (14). Accordingly, it is appreciated that, when the seat back (12) is folded down onto the seat cushion (18), thus being set in a horizontal storage position as in FIG. 2, the back board (14) exposed in the seat back (12) may be transformed into a robust load-carrying platform sufficient to withstand a downward load (i.e. F1) and therefore allows its use as an extended or enlarged cargo loading area in vehicle for instance.

On the other hand, the back board (14) is resiliently deformable backwardly or can yield backwardly to a backward force or load (F2) applied from the forward side (F) in a direction to the backward side (R), as in FIG. 4. This is because, when the backward load (F2) is applied to the seat back (12), the back board (14) of synthetic resin material is subjected to pressure in the backward direction, which in turn causes the tension coil springs (34) to resiliently extend, while simultaneously causing the cubic protrusions (32) to resiliently displace away from one another, with the crevices (30l) opened, thereby allowing the back board (14) to readily deform or warp in the backward direction, as shown in FIG. 4. In other words, reference is now made to FIGS. 1 and 5. Normally, the seat back (12) is set in an upright use position as in FIG. 1. In that instance, when a passenger sits on the seat (16), resting his back against the seat back (12), a corresponding backward load (F2) is exerted upon the frontal surface (at 12a) of seat back (12), with the result that the back board (14) yields thereto in the backward direction, while at the same time, pulling and extending the springs (34), as shown in FIG. 5. This means that the back board (14) can be resiliently deformed into an optimum shape to substantially receive the passenger's back in conformity therewith, so that the passenger can enjoy a comfortable seating with a proper additional cushiony effect given by the springs (34). Moreover, the back board (14) can be returned into the normal flat state under the biasing force of the springs (34) when in no use or when no seat occupant leans against the seat back (12).

With such arrangement, it follows that the seat occupant's back support side (12a) of seat back (12) is not only substantially supported by the tension coil springs (34) in a resilient way, but also can be flexibly deformed by or readily yielding to a load caused by a weight of a seat occupant's upper body portion. This suffices to provide an optimum cushioning effect and back support touch, so that a passenger sitting on the seat (16) enjoy a comfortable support touch at his or her back without feeling any hardness as found due to the conventional back board. Thus, it is possible to reduce a thickness of the foam padding (22), which means that the thickness of the seat back (12) can be decreased as required, while retaining a sufficient cushion effect when the seat back (12) is in the upright use position (see FIG. 1), and also the back board (14) can be transformed into a robust load-carrying platform when the seat back (12) is in the horizontal storage position (see FIG. 2).

The tension coil springs (34) are not limitative, but any other pulling-type biasing means may be used insofar as it fulfills the purpose of the present invention stated above. For example, leaf springs, rubber materials, or any other suitable elastic means may be utilized for that purpose.

Figure 6:
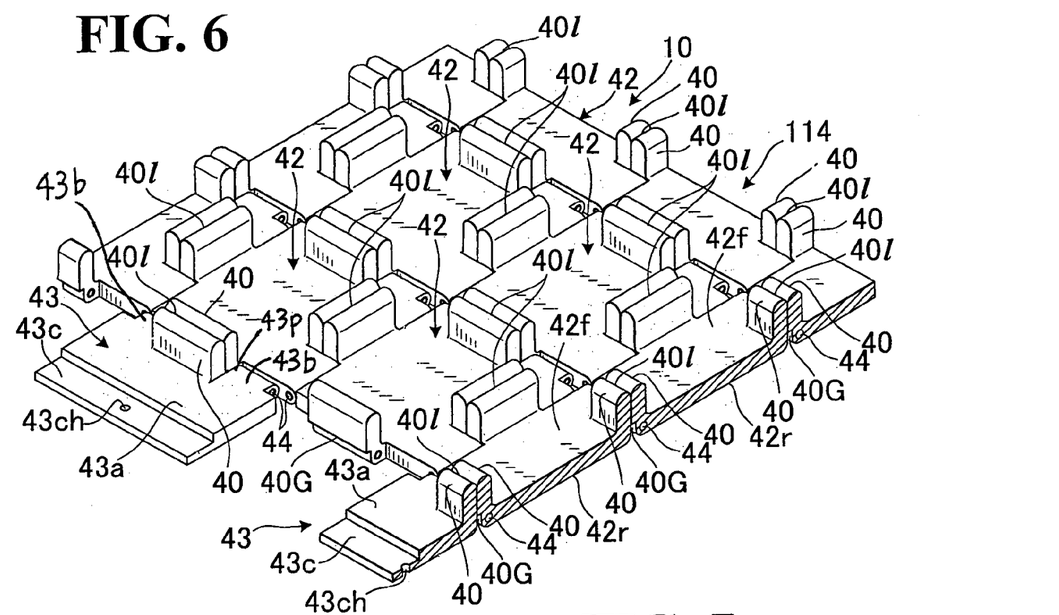
FIG. 6 is a partly broken perspective view showing another alternative mode of back board in a second embodiment of the seat back structure.

Reference is made to FIGS. 6 to 10 which show a second embodiment of the seat back structure (10) which is provided with a second alternative mode of back board as generally designated by (114). According to the present embodiment, in place of the cubic protrusions (32) of the foregoing first embodiment, a plurality of first square plate pieces (42) are movably connected with one another to provide a main body of such back board (114), while a plurality of second square plate pieces (43) are movably connected with the peripheral ends of those first square plate pieces (42) to provide a connecting peripheral end portion of the back board (114), as illustrated in FIG. 6. Each of the first and second square plate pieces (42) (43) may be formed from a hard synthetic resin material, a rigid metallic material, or the like.

Figures 7, 8:
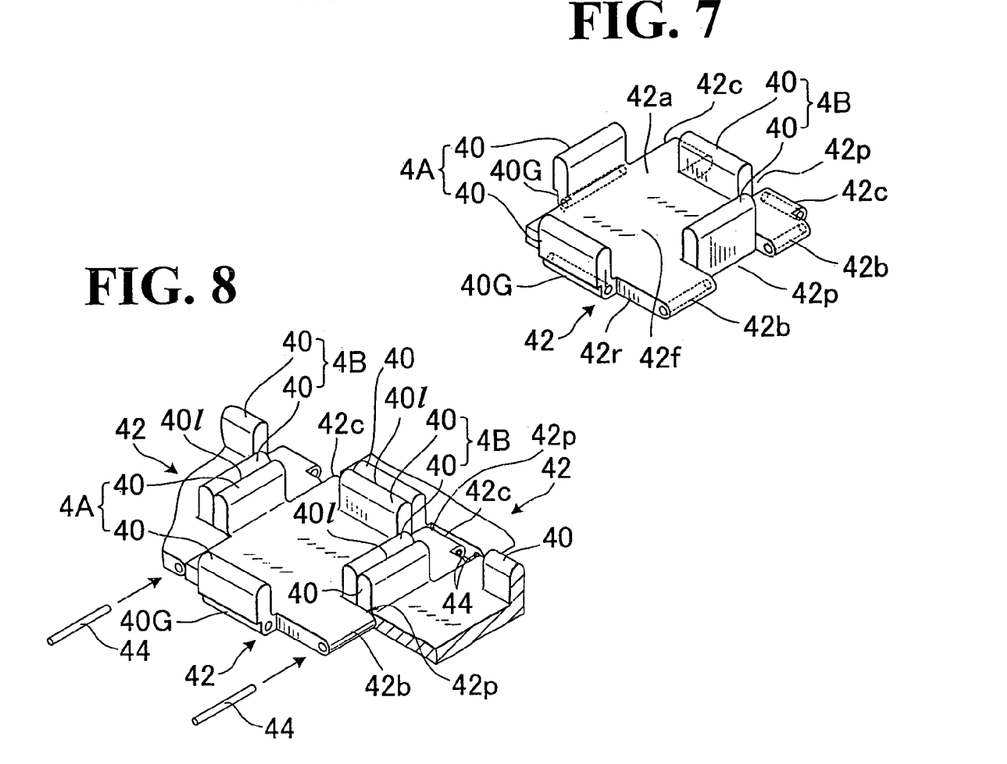
FIG. 7 is a perspective view of a square plate piece forming one element of the back board in the second embodiment.
FIG. 8 is a diagram for explanatorily showing how a plurality of the square plate pieces are pivotally connected with one another.

As best shown in FIG. 7, each of the first square plate pieces (42) is basically comprised of: a flat body portion (42a) having a first surface (42f) (i.e. outer surface) and a second surface (42r) (i.e. inner surface) opposite to the first surface (42f); and four vertical stopper pieces (40) formed integrally with that flat body portion (42a).

More specifically, referring again to FIG. 7, construction of the first square plate piece (42) is such that the flat body portion (42a) thereof is formed with:

a first pair of the vertical stopper pieces (40) which are respectively defined in a first pair of adjacent sides of the flat body portion (42a) in an integral way, projecting upwardly from the first surface (42f) (i.e. one set of two vertical pieces (40) on the left as viewed from FIG. 7), which shall hereinafter be referred to as "a first pair of vertical stopper pieces (4A)";

a first pair of horizontally projected connecting portions (42b) defined integrally in one of a second pair of adjacent sides of the flat body portion (42a), with a connecting space (42p) defined between those two connecting portions (42a), wherein such particular second pair of adjacent sides are diagonally opposite to the foregoing first pair of adjacent sides within the square flat body portion (42a);

a second pair of horizontally projected connecting portions (42c) defined integrally in another of the second pair of adjacent sides of flat body portion (42a), with a connecting space (42p) defined between those two connecting portions (42c); and a second pair of the vertical stopper pieces (40) which are integrally arranged in the respective afore-said second pair of adjacent sides of flat body portion (42a), such that one of those another pair of vertical stopper pieces (40) is formed between the first pair of horizontally projected connecting portions (42b), while another of those another pair of vertical stopper pieces (40) is formed between the second pair of horizontally projected connecting portions (42b). Such paired vertical stopper pieces (40) project upwardly from the first surface (42f) and shall be referred to as "a second pair of vertical stopper pieces (4B)".

As indicated by the phantom lines in FIG. 7, a through-hole is formed in the juncture portion between each vertical stopper piece (40) and the side of flat body portion (42a) corresponding to that vertical stopper piece (40), and further, a through-hole is formed in the distal end portion of each connecting portion (42b).

Designation (40G) denotes a recessed region formed in the lower portion of each of the first pair of vertical stopper pieces (4A). As will be explained, this recessed region gives a play which allows the adjoining square plate pieces (42) to be smoothly movable without interference with one another.

As can be seen from FIG. 6, each of the second square plate pieces (43) is comprised of: a plate body portion (43a); a pair of horizontally projected connecting portions (43b), wherein a connecting space (43p) is defined between the two connecting portions (43b); a vertical stopper piece (40) formed integrally between the two horizontally projected connecting portions (43b); and a securing end portion (43c).

The arrangement and connection of those first and second square plate pieces (42) (43) can be understood by looking at FIGS. 6 and 8.

Namely, referring to FIGS. 6 and 8, a brief description will be made thereof for better understanding. The first pair of vertical stopper pieces (4A) of one first square plate piece (42) are respectively fitted in a connecting space of another first square plate piece (42) and a connecting space of still another fist square plate piece (42), wherein those connecting spaces are identical to the connecting spaces (42p) described above, though not designated. Further, the second pair of vertical stopper pieces (4B) of the foregoing one first square plate piece (42) are respectively, rotatably connected with the foregoing two another first square plate pieces (42) by inserting connecting pins (44) through the corresponding through-holes (not designated) as indicated by arrows in FIG. 8 for instance. Accordingly, normally, as shown, the first pair of vertical stopper pieces (4A) are respectively contacted with the vertical stopper piece (40) of the foregoing another first square plate piece (42) and the vertical stopper piece (40) of the foregoing yet another first square plate piece (42). Also, on the other hand, the two vertical stopper pieces (40) of still yet another two first square plate pieces (42) are respectively fitted in the two connecting spaces (42p) of the foregoing original fist square plate piece (42) while being further respectively, rotatably connected with that particular first square plate piece (42) by inserting connecting pins (44) through the corresponding through-holes as indicated in FIG. 8 for instance. Thus, normally, as shown, the second pair of vertical stopper pieces (4B) are respectively contacted with the two vertical stopper pieces (40) respective of the foregoing still yet another two first square plate pieces (42). With regard to the second square plate piece (43), as can seen from FIG. 6, the vertical stopper piece (40) of first square plate piece (42) is fitted in the connecting space (43p) of the second square plate piece (43) and rotatably connected with that particular second square plate piece (43) by inserting a connecting pin (44) through the corresponding through-hole in substantially the same manner as shown in FIG. 8. The second square plate piece (43) has a flange portion (43c) in which a securing hole (43ch) is formed for a purpose to be set forth later.

In that way, as can be seen in FIG. 6, a whole of the back board (114) is constructed such that the first square plate pieces (42) are movably connected with one another in an orderly arranged way, and the second square plate pieces (43) are movably connected with the outer ends of the first square plate pieces (42), thus forming a peripheral end portion of the back board (114).

Figure 9:
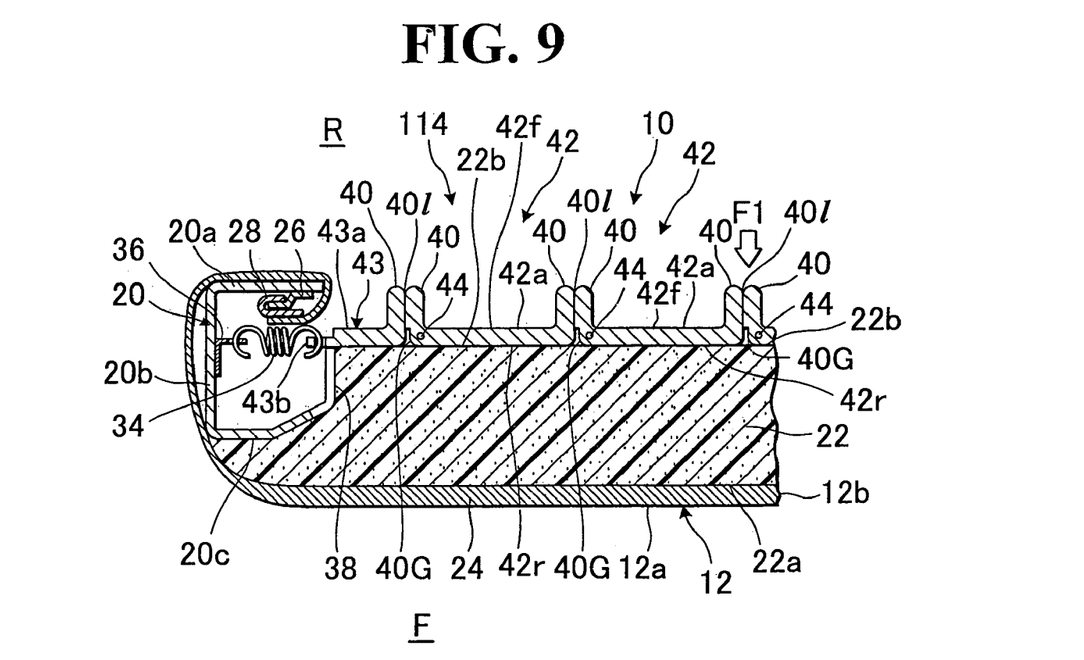
FIG. 9 is a fragmentary sectional view showing a principal part of the second embodiment of seat back structure, which depicts the back board to be retained in a flat state against a load.

With such arrangement, normally, as shown in FIGS. 6 and 9, a whole of the back board (114) assumes a flat plate extending on a flat plane and along a rectilinear line by virtue of the fact that all the orderly disposed vertical stopper pieces (40), which extend perpendicularly with respect to the flat body portion (42*a*), are in contact with one another, such that each crevice (40*l*) defined between the two vertical stopper pieces (40) is closed tight. As seen in FIG. 6, all the crevices (40*l*) are arranged on the outer side of the back board (114) corresponding to the first surfaces (42*f*) of first square plate pieces (42) in an equidistantly spaced relation with one another so as to extend in a substantially grid way.

Referring now to FIGS. 7 and 8, it is firstly noted that the seat back (12) to which the present second embodiment is applied is identical in structure to the seat back described in the first embodiment, including the trim cover assembly (12*b*), foam padding (22) and seat back frame (20). Thus, the detailed description thereof is omitted, and all like designations to be given hereinafter corresponds to all like designations that have been used in the first embodiment.

While not shown completely, but as understandable from FIG. 9, the back board (114) is securely mounted on the backward side of the seat back (12) by the steps of: contacting the second surfaces (42*r*) of the first square flat pieces (42) upon the backward surface (22*b*) of the foam padding (22); then, engaging one end of each of tension coil springs (34) with each of the spring securing lugs (36) fixed to the seat back frame (20); and engaging another end of each of the tension coil springs (34) with each of the securing holes (43*ch*) of second square plate piece (43). By being so done, the back board (114) is resiliently stretched and supported by the tension coil springs (34) in all angles on the backward side of seat back (12), with all the vertical stopper pieces (40) projecting backwardly of the seat back (12), as in FIG. 9. In other words, due to the outward biasing force of the springs (34), all the vertical stopper pieces (40) are normally biased into contact with one another, with all the crevices (40*l*) thereamong being closed tight, as in FIG. 9, whereupon a whole of the back board (114) is retained in a uniformly expanding state or in the state of extending on a flat plane and along a rectilinear line. Otherwise stated, the back board (114) is in a normal plate-like state. Under such normal flat state, even when applied by a force or load (F1) (e.g. a weight of cargoes, luggage and the like) from the backward side of seat back (12), the back board (114) per se is rigid enough to withstand the load (F1) and does not yield thereto in a direction to the side (F). Further, since the second square plate piece flange portions (43*a*) rest against the upper ends of stopper pieces (38), the back board (114) per se is positively prevented against forward movement toward the frontal side (at 12*a*) of seat back (12). This also advantageously allows the load (F1) to be dispersed and transmitted via the flange portions (43*a*) to the seat back frame (20), thereby being effective to prevent breakage and deformation of the back board (114). Accordingly, it is appreciated that, when the seat back (12) is folded down onto the seat cushion (18), thus being set in a horizontal storage position as in FIG. 9, the back board (114) exposed in the seat back (12) can be used as a robust load-carrying platform which may form an extended cargo loading area in vehicle for instance.

Figure 10:
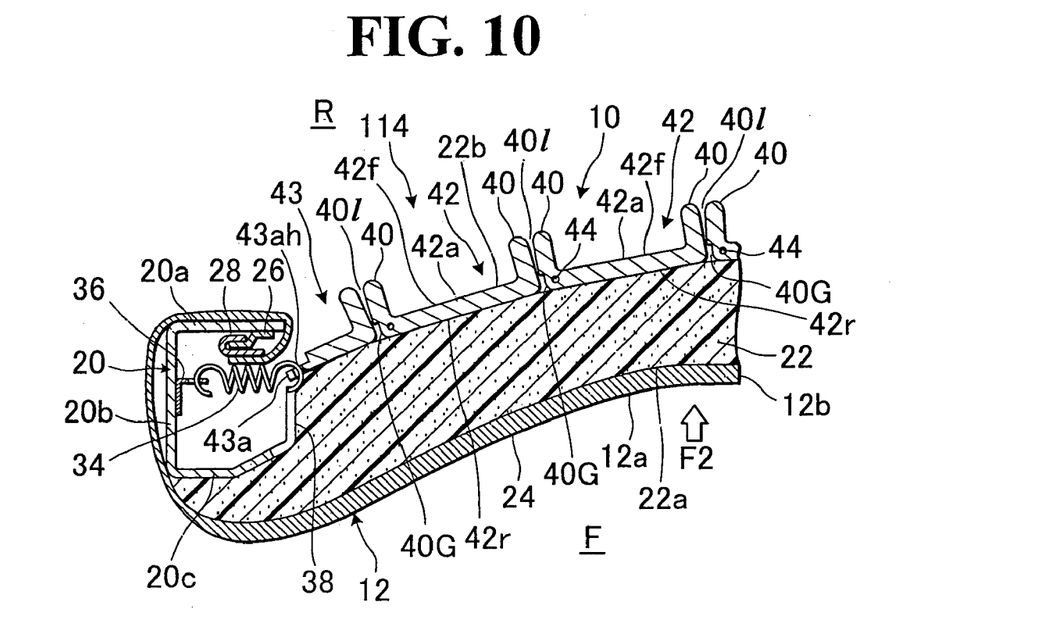
FIG. 10 is a fragmentary sectional view showing a principal part of the second embodiment of seat back structure, which depicts the back board to be resiliently deformed by a backward load.

On the other hand, the back board (114) is resiliently deformable backwardly or can yield backwardly to the backward force or load (F2), as in FIG. 4. This is because, when the backward load (F2) is applied to the seat back (12), the back board (114) of hard material is subjected to pressure in the backward direction, which in turn causes the tension coil springs (34) to resiliently expand, while simultaneously causing the vertical stopper pieces (40) to resiliently displace away from one another, due to the fact that the recessed region (40G) gives a play among the adjoining square plate pieces (42), thereby allowing those plate pieces (42) to be easily movable without interference with one another. Simultaneous therewith, the crevices (40*l*) defined between the two vertical stopper pieces (40) are opened, with the result that the back board (114) is readily deformed or warped in the backward direction, as shown in FIG. 10.

Accordingly, the back board (114) can be resiliently deformed into an optimum shape to substantially receive the passenger's back in conformity therewith, so that the passenger can enjoy a comfortable seating with a proper cushiony effect given by the springs (34). Moreover, the back board (114) can be returned into the normal flat state under the biasing force of the springs (34) when in no use. Thus, the same effects as described in the first embodiment are attainable effectively.

Figure 11:
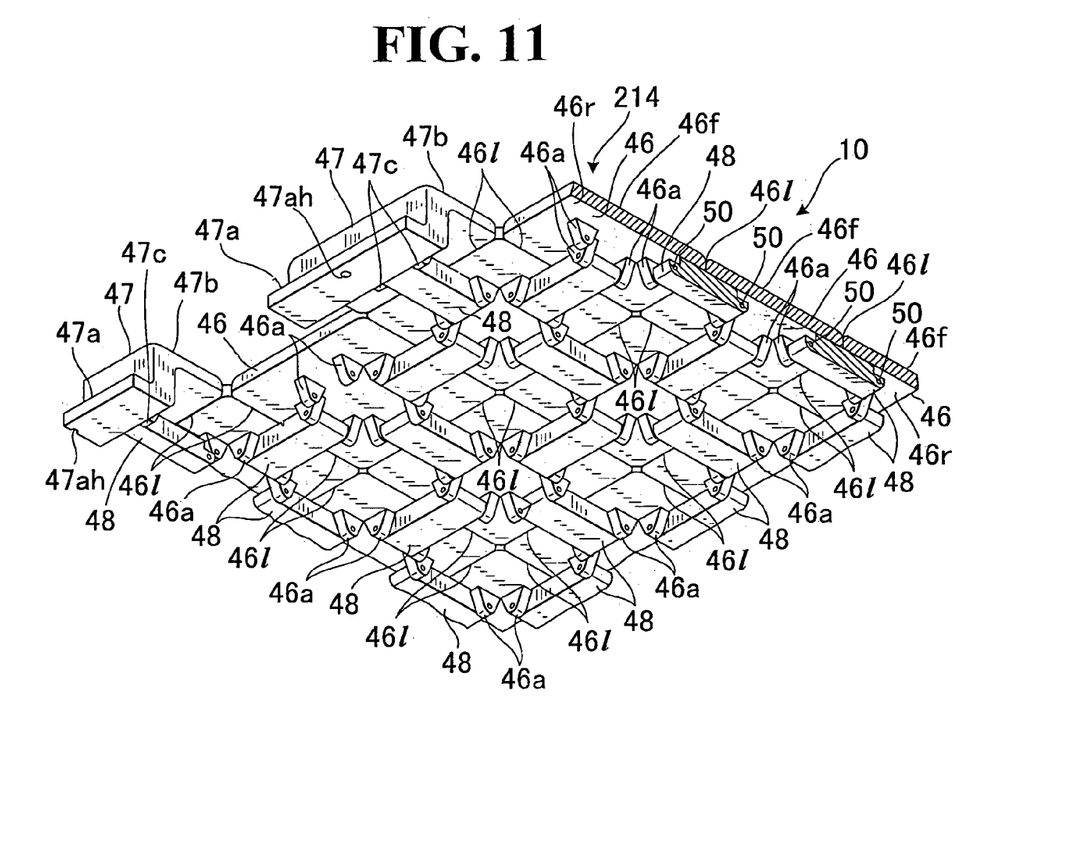
FIG. 11 is a partly broken perspective view showing still another alternative mode of back board in a third embodiment of the seat back structure.
Figure 12:
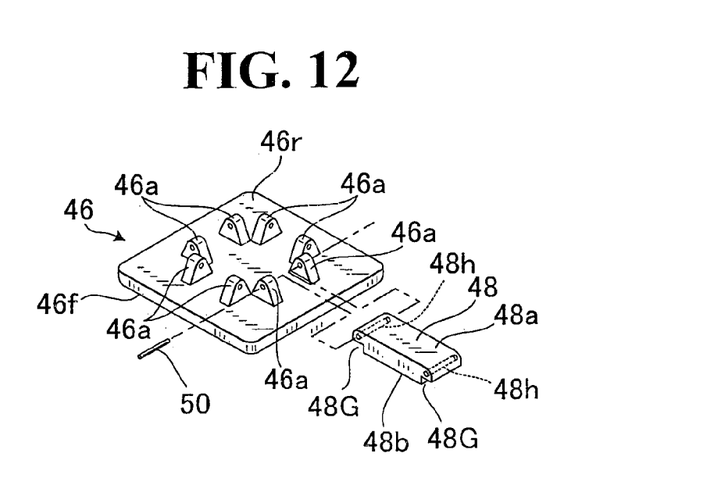
FIG. 12 is a diagram for explanatorily showing how a link piece is pivotally connected with one square plate piece.

Reference is made to FIGS. 11 and 12 which show a third embodiment of the seat back structure (10) which is provided with a third alternative mode of back board as generally designated by (214). According thereto, a plurality of first square plate pieces (46) are movably connected with one another via link pieces (48) in an orderly manner, thereby forming a square main body of such back board (214). Further, a plurality of second square plate pieces (47) are movably connected via link pieces (48) with the peripheral ends of those first square plate pieces (46), thereby forming a connecting peripheral end portion of the back board (114), as illustrated in FIG. 11. Each of the first and second square plate pieces (46) (47) may be formed from a hard synthetic resin material, a rigid metallic material, or the like.

As best shown in FIG. 12, each of the first square plate pieces (46) is comprised of a flat body portion (46*a*) having a first surface (46*f*) and a second surface (46*r*), and four sets of two spaced-apart connecting lugs (46*a*) (46*a*) integrally formed on the second surface (46*r*) of that flat body portion (46*a*). It is seen in the FIG. 12 that those four sets of two spaced-apart connecting lugs (46*a*) are integrally formed in the flat body portion (48*a*) so as to be disposed in parallel with the respective four edges of the first square plate piece (46). As shown, each of the connecting lugs (46*a*) has a hole (not designated) formed therein, through which hole, a connecting pin (50) is to be inserted as will be explained below.

The link piece (48) is of such a configuration as shown in FIG. 12, comprising a first half portion (48*a*) and a second half portion (48*b*), wherein a pair of connecting through-bores (48*h*) (48*h*) are respectively formed in two end portions of the first half portion (48*a*), while a pair of recessed regions (48G) (48G) are respectively formed in two end portions of the second half portion (48*b*). Each of the recessed regions (48G) of the link pieces (48) serves to give a play which allows the adjoining square plate pieces (46) to be easily movable without interference with the link pieces (48), as will be apparent later.

As seen in FIG. 11, the second square plate piece (47) is so formed to have: a plate body portion (47*b*); a pair of spaced-apart connecting lugs (47*c*) formed in the reverse side of the plate body portion (47*b*); and a flange portion (47*a*) in which a connecting hole (47*ah*) is formed.

FIG. 12 is an exemplary diagram indicating how the link piece (48) is connected with the first square plate piece (46). As indicated in the FIG. 12, one end portion of the link piece (48) is placed between the two connecting lugs (46a), and then, a connecting pin (50) is inserted and secured in the through-holes respective of the two connecting lugs (46a) and link piece (48) so that the both plate and link pieces (46) (48) are rotatably connected together by the connecting pin (50). While not shown completely, but, as understandable from both FIGS. 11 and 12, another three link pieces (48) are pivotally connected with another remaining three sets of two connecting lugs (46a) of the first square plate piece (46), respectively, by three corresponding connecting pins (50). In that manner, as shown in FIG. 11, all other remaining first square plate pieces (46) are connected with one another by all other link pieces (48) in an orderly arranged way, with crevices (46l) defined thereamong in an orderly grid fashion, whereupon a main square body of the back board (214) is formed. Finally, the second square plate pieces (47) are each, at its two connecting lugs (47c), connected by one link piece (48) with a free end of each of the first square plate pieces (46) disposed in the outermost four sides of the back board (214), whereupon a peripheral flange portion is formed around the back board (214).

Figure 13:
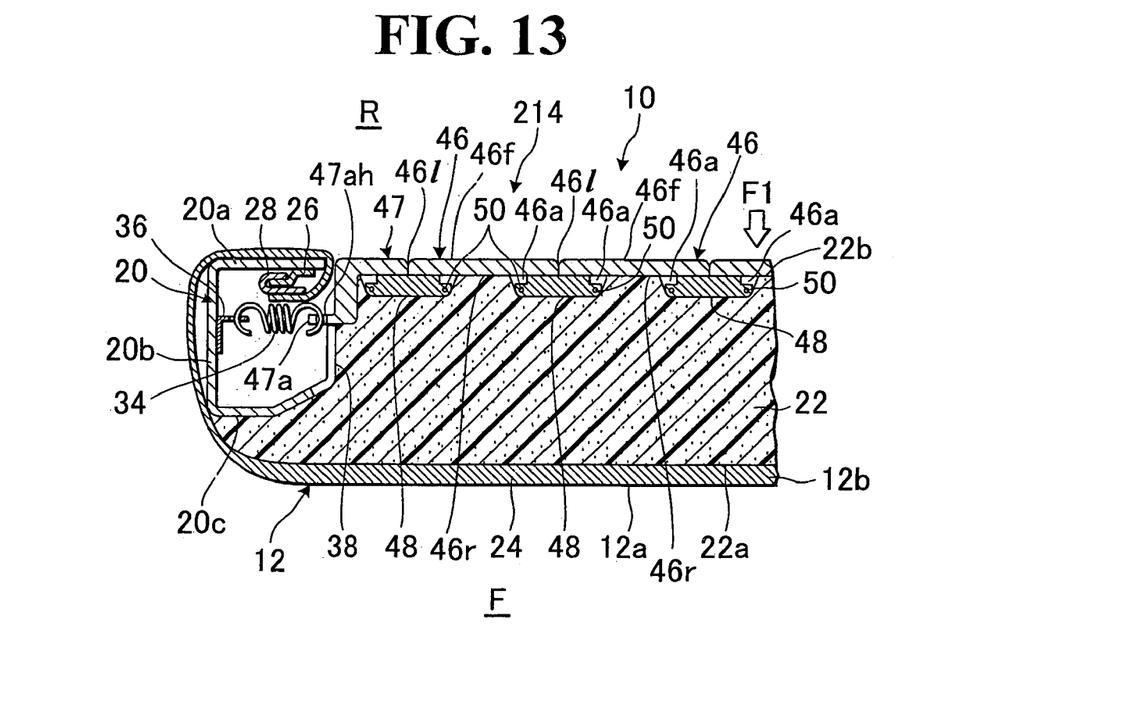
FIG. 13 is a fragmentary sectional view showing a principal part of the third embodiment of seat back structure, which depicts the back board to be retained in a flat state against a load.
Figure 14:
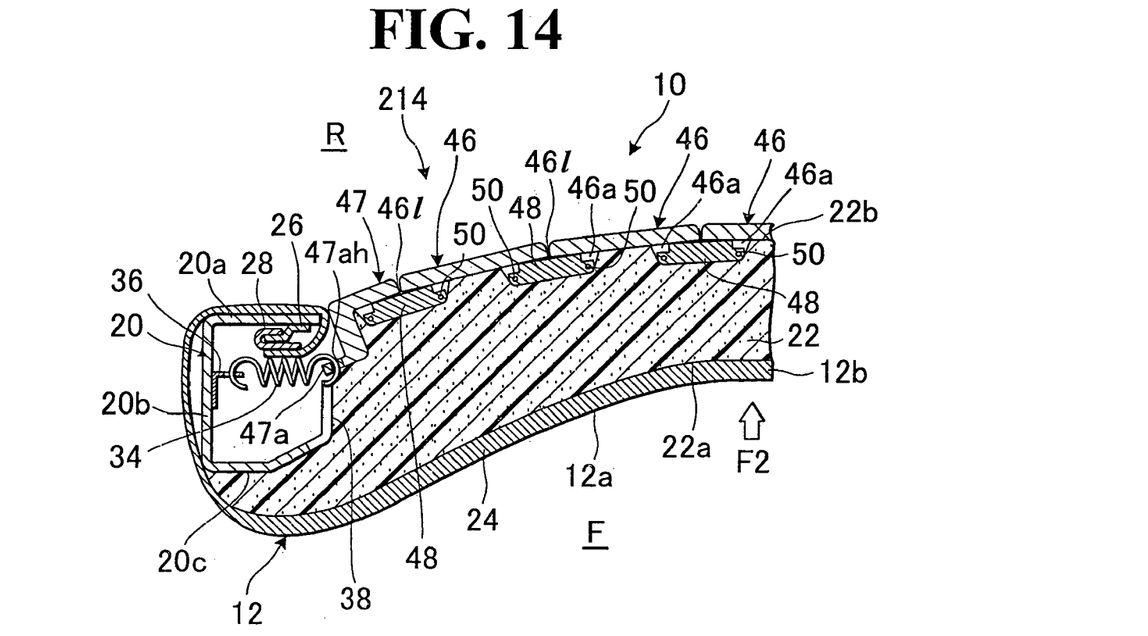
FIG. 14 is a fragmentary sectional view showing a principal part of the third embodiment of seat back structure, which depicts the back board to be resiliently deformed by a backward load.

Referring now to FIGS. 13 and 14, likewise as stated above, the seat back (12) to which the present embodiment is applied is also identical in structure to the seat back described in the first and second embodiments, including the trim cover assembly (12b), foam padding (22) and seat back frame (20). Thus, the detailed description thereof is omitted, and all like designations to be given hereinafter corresponds to all like designations that have been used in the first and second embodiments.

While not shown completely, but as understandable from FIG. 13, the back board (214) is securely mounted on the backward side of the seat back (12) through the steps of: contacting both of the second surfaces (46r) of first square flat pieces (46) and the link pieces (48) upon the backward surface (22b) of foam padding (22); then, engaging one end of each of tension coil springs (34) with each of the spring securing lugs (36) fixed in the seat back frame (20); and engaging another end of each of the tension coil springs (34) with each of the securing holes (47ah) associated with the second square plate piece (47). By being so done, the back board (214) is resiliently stretched and supported by the tension coil springs (34) in all angles on the backward side of seat back (12).

In other words, due to the outward biasing force of the springs (34), all the first square plate pieces (46) are stretched outwardly on the same plane, providing a flat plane, such that their respective four peripheral edges are normally biased into contact with one another, with all the crevices (46l) thereamong being closed tight, whereupon a whole of the back board (214) is retained in a uniformly expanding state or in the state of extending on a flat plane and along a rectilinear line. Otherwise stated, the back board (114) is retained in a normal plate-like state. Under such normal flat state, even when applied by a forward force or load (F1) (e.g. a weight of cargoes, luggage and the like) from the backward side of seat back (12), all the first square plate pieces (46) are completely prevented by the link pieces (48) against movement in the forward direction (i.e. to the side (F) in FIG. 13). Hence, the back board (214) per se is rigid enough to withstand the forward load (F1) and does not yield thereto in the forward direction. Further, as the second square plate piece flange portions (47a) rest against the upper ends of stopper piece (38), the back board (114) per se is positively prevented against movement toward the frontal side (12a) of seat back (12). This also advantageously allows the load (F1) to be dispersed and transmitted via the flange portions (47a) to the seat back frame (20), thereby being effective to prevent breakage and deformation of the back board (214). Accordingly, it is appreciated that, when the seat back (12) is folded down onto the seat cushion (18), thus being set in a horizontal storage position as in FIG. 2, the back board (214) exposed in the seat back (12) can be used as a robust load-carrying platform which may form an extended cargo loading area in vehicle for instance.

On the other hand, the back board (214) is resiliently deformable backwardly or can yield backwardly to the force or load (F2), as in FIG. 14. This is because, when the load (F2) is applied to the seat back (12), the back board (114) of hard material is subjected to pressure in the backward direction, which in turn causes the tension coil springs (34) to resiliently expand, while simultaneously causing the first and second square pieces (46) (47) to rotatively displace away from one another relative to their associated link pieces (48), due to the fact that the recessed region (40G) gives a play among the adjoining square plate pieces (46) (47), thereby allowing those plate pieces (46) (47) to be easily movable without interference with one another. Simultaneous therewith, the crevices (46l) defined among the square plate pieces (46) are opened, with the result that the back board (214) is readily deformed or warped in the backward direction, as shown in FIG. 14.

Accordingly, the back board (214) can be resiliently deformed into an optimum shape to substantially receive the passenger's back in conformity therewith, so that the passenger can enjoy a comfortable seating with a proper cushiony effect given by the springs (34). Moreover, the back board (214) can be returned into the normal flat state under the biasing force of the springs (34) when in no use. Thus, the same effects as described in the first embodiment are attainable effectively.

Figure 15:
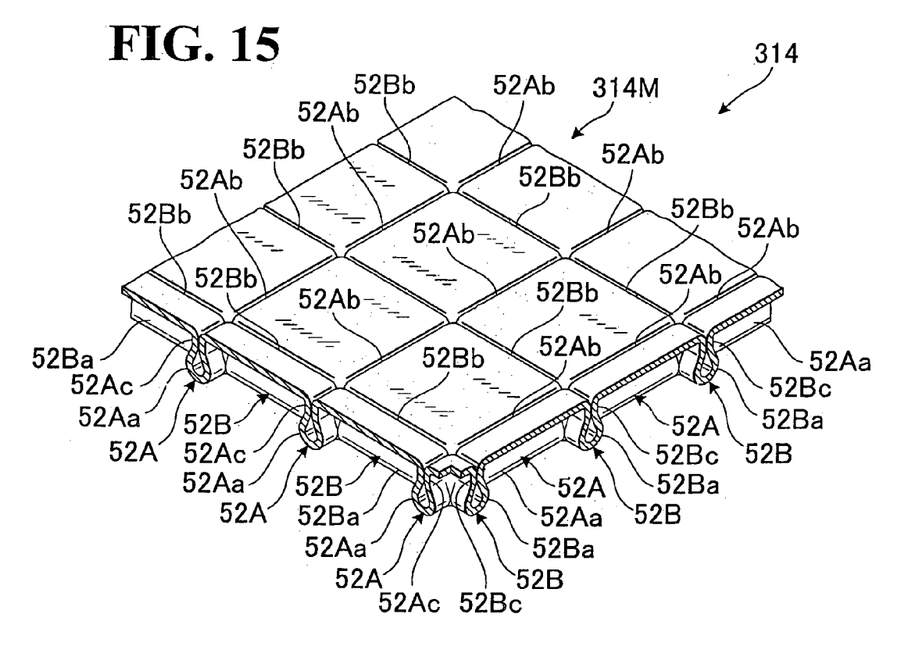
FIG. 15 is a partly broken perspective view of a yet another alternative mode of back board in a fourth embodiment of the seat back structure, which particularly shows the main area of the back board.
Figure 16:
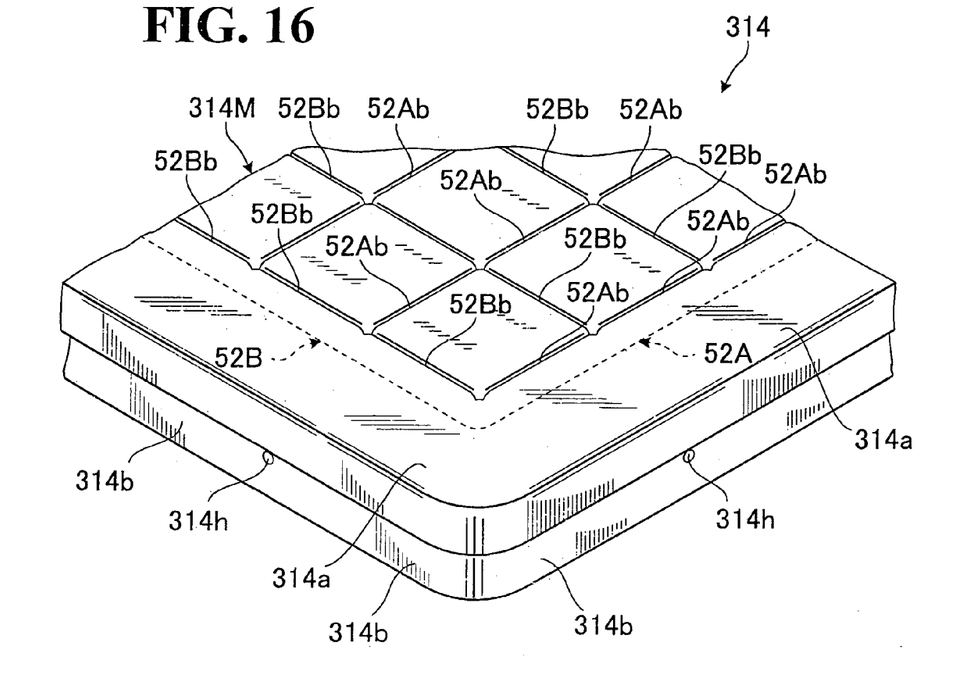
FIG. 16 is a partly broken perspective view showing a whole of such yet another alternative mode back board shown in FIG. 15, which is formed with an integral peripheral rim portion.

Reference is made to FIGS. 15 and 16 which show a fourth embodiment of the seat back structure (10) which is provided with a fourth alternative mode of back board as generally designated by (314).

In the present embodiment, the back board (314) is formed from a plate material of synthetic resin having a certain rigidity yet elastic property, and subjected to a proper molding so as to provide the illustrated configuration having, defined therein, a gridironed (or grid-pattered) main area (314M) and a rectangular rim portion (314a) surrounding the gridironed main area (314M). In brief, formation of the gridironed main area (314M) is such that a plurality of crevices (52Ab) (52Bb) are defined in the outer surface thereof in an orderly grid fashion, while a plurality of first and second elastic hinge portions (52A) (52B) are defined in the reverse inner surface thereof in an orderly gird fashion.

Specifically, as viewed from FIG. 15, in the gridironed main area (314M) of back board (314), the plurality of first elastic hinge portions (52A) extend lengthwise in an equidistantly spaced-apart relation with one another, whereas, likewise, the plurality of second elastic hinge portions (52B) extend crosswise in an equidistantly spaced-apart relation with one another.

As shown, each first elastic hinge portion (52A) is of a generally "inverted Ω" cross-section, comprising a generally cylindrical base portion (52Aa) and a neck portion (52Ac) defined by the two upper end portions of the generally cylindrical base portion (52Aa), wherein the two walls of neck portion (52Ac) are normally biased to contact with each other due to the resilient recovery property of the back board (314), thereby defining a rectilinearly extending crevice (52Ab) in the outer surface of the main area (314M) along the longitudinal direction of the neck portion (52Ac). It is seen that the crevice (52Ab) is in a closed state, and that the generally cylindrical base portions (52Aa) are situated in the reverse side of the main area (314M) opposite to the crevices (52Ab).

As similar to such first elastic hinge portion (52A), each second elastic hinge portion (52B) also assumes a generally "inverted Ω" shape in cross-section, comprising a generally cylindrical base portion (52Ba) and a neck portion (52Bc). Due to the resilient recovery property of back board (314), the two walls of neck portion (52Bc) are normally biased to contact with each other, thereby defining a rectilinearly extending crevice (52Ab) in the outer surface of the main area (314M) along the longitudinal direction of the neck portion (52Ac), wherein the crevice (52Ab) is in a closed state. It is observed that the generally cylindrical base portions (52Aa) are situated in the reverse side of the main area (314M) opposite to the crevices (52Ab).

Hence, a plurality of those lengthwise and crosswise extending elastic hinge portions (52A) (52B) intersect to establish an orderly grid pattern of crevices (52Ab) (52Bb) on the outer surface of the back board main area (314M), as understandable from FIG. 15.

As shown in FIG. 16, the back board (314) has a generally rectangular peripheral rim portion (314a) formed integrally with all the peripheral ends thereof. The peripheral flange portion (314a) per se extends horizontally and flush with the flat outer surface of the grid-like patterned central area (314M) of back board (314) beneath which the first and second elastic hinge portions (52A) (52B) are arranged. Designation (314b) denotes a downwardly extending vertical wall portion of the peripheral flange portion (314a). Designation (314h) denotes a securing hole formed in that vertical wall portion (314b).

As understandable from the phantom lines in FIG. 16, outermost first and second elastic hinge portions (52A) (52B) are each defined rectilinearly so as to exited along a rectangular boundary between the peripheral flange portion (314a) and the gridironed main area (314M).

Figure 17:
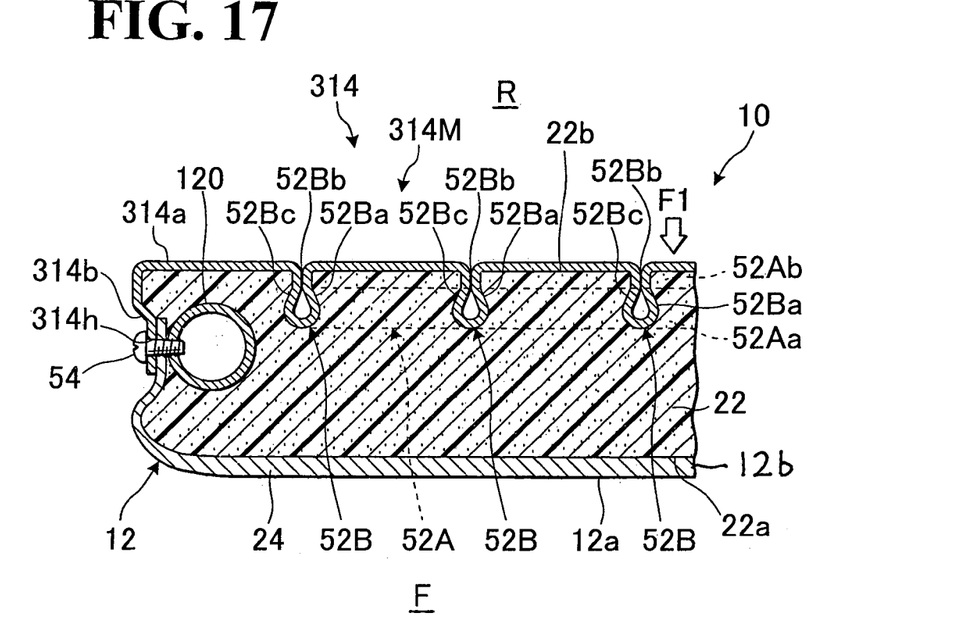
FIG. 17 is a fragmentary sectional view showing a principal part of the fourth embodiment of seat back structure, which depicts the back board to be retained in a flat state against a load.
Figure 18:
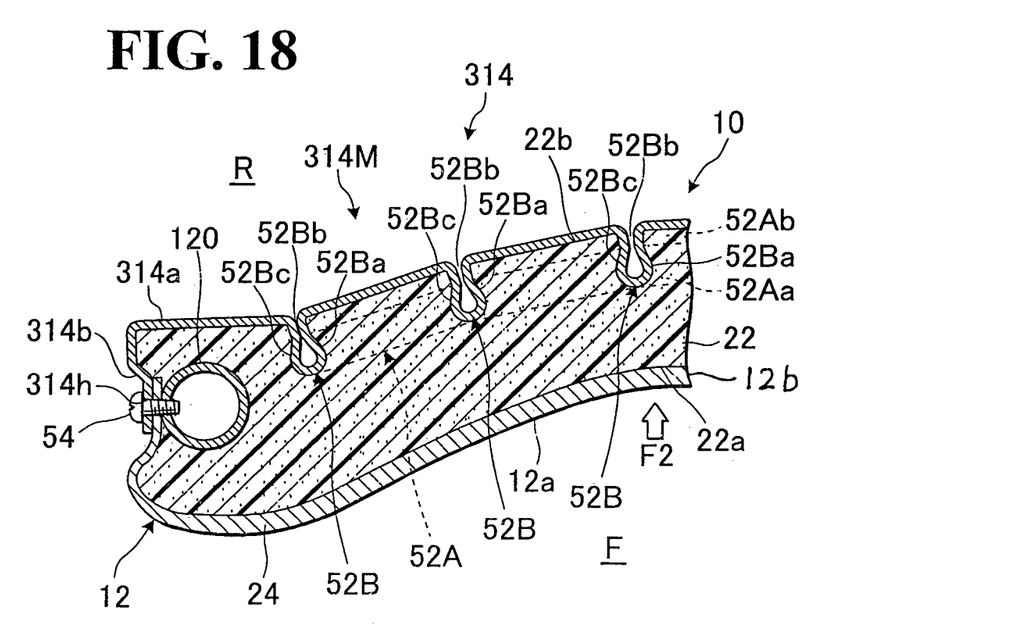
FIG. 18 is a fragmentary sectional view showing a principal part of the fourth embodiment of seat back structure, which depicts the back board to be resiliently deformed by a backward load.

Referring now to FIGS. 17 and 18, the seat back (12) used in the present fourth embodiment is basically similar to the seat back described theretofore in terms of the trim cover assembly (12b) and foam padding (22), except that a tubular seat back frame (120) is provided. In this respect, all like designations to be given hereinafter correspond to all like designations that have been used in the first and second embodiments.

While not shown completely, but as understandable from FIG. 13, at first, the peripheral ends of the trim cover assembly (12b) are attached to the outer side of the tubular seat back frame (120), after which, a whole of the back board (314) is securely mounted on the backward side of the seat back (12) by forcibly pressing the back board (314) against the backward surface (22b) of foam padding (22) so that the vertical wall portions (314b) of peripheral rim portion (314a) are attached on the peripheral vertical walls of the foam padding (22) and juxtaposed with the peripheral end portions of the trim cover assembly (12b). As a result thereof, the reverse side of main area (314M) or the first and second elastic hinge portions (52A) (52B) are plunged into and substantively embedded in the foam padding (22). As shown, securing screws (54) are inserted into the respective securing holes (314h) and driven through the juxtaposed layers of the back board vertical wall portions (314b) and trim cover assembly peripheral end portions into the securing holes (not designated) of the tubular seat back frame (120).

Accordingly, the back board (314) is securely mounted on the backward side of seat back (12).

As shown in FIGS. 17 and 18, the back board (314) is normally in the flatly stretched state, providing a flat plane at the back side of seat back (12), by the reason of the fact that the neck portions (52Ac) (52Bc) of the first and second elastic hinge portions (52A) (52B) are tightly contacted with each other due to the inwardly biasing force of the respective cylindrical base portions (52Aa) (52Ba), thereby biasingly causing the back board main area (314M) to expand horizontally and flatly. Thus, under that state, all the crevices (52Ab) (52Bb) are normally closed tight, and the back board main area (314M) is retained in a normal plate-like state. Under such normal flat state, even when applied by a force or load (F1) (e.g. a weight of cargoes, luggage and the like) from the backward side of seat back (12), the aforementioned closed state of the neck portions (52Ac) (52Bc) and grid-like arranged hinge portions (52A) (52B) effectively cooperate with one another to prevent the back board (314) against movement in a direction to the side (F). Hence, the back board main area (314M) per se has a rigidity enough to withstand the load (F1) and does not yield thereto in the forward direction.

In this connection, the rectangular peripheral rim portion (314a) surrounding the main area (314M) is structurally robust enough to receive the load (F1) imparted through the first and second hinge portions (52A) (52B) and transmit the same to the seat back frame (120). Thus, an entirety of the back board (314) is positively prevented against further forward movement beyond the flat plane toward the frontal side (at 12a) of seat back (12), thereby preventing breakage and deformation of the back board (314). Accordingly, it is appreciated that, when the seat back (12) is folded down onto the seat cushion (18), thus being set in a horizontal storage position as in FIG. 2, the back board (314) exposed in the seat back (12) can be used as a robust load-carrying platform which may form an extended cargo loading area in vehicle for instance.

By contrast, the back board main area (314M) is resiliently deformable backwardly or can yield backwardly to the backward force or load (F2), as in FIG. 18. Namely, when the backward load (F2) is applied to the seat back (12), the back board (314) is subjected to pressure in the backward direction. This backward pressure in turns causes the two contacted walls of each of the neck portions (52Ac) (52Bc) to move away from each other against the inwardly biasing force of the corresponding first and second elastic hinge portions (52A) (52B), with the result that most of the crevices (52Ab) (52Bb) are opened as seen from FIG. 18. Consequently, the back board main area (314M) is resiliently warped backwardly (to the side (R)) and thus deformed into an optimum shape to substantially receive the passenger's back in conformity therewith, so that the passenger can enjoy a comfortable seating. Moreover, the back board main area (314M) can be returned into the normal flat state, when in no use, under the inwardly biasing force of the first and second elastic hinge portions (52A) (52B). Thus, the same effects as described in all the foregoing embodiments are attainable effectively.

According to the fourth embodiment, the back board (314) itself is simplified in structure and easy to produce from one base material, because it can be simply formed by a proper molding or the like without any other separate parts. Of course, the first and second elastic hinge portions (52A)

(52B) are not limited to the "inverted Ω" cross-section, but may be formed into a "inverted U" in cross-section which will have the same action and effects as described above.

While having described the present invention thus far, it should be understood that the invention is not limited to the illustrated embodiments, but any other modification, replacement and addition may be applied thereto without departing from the scopes of the appended claims.

What is claimed is:

1. A structure of a seat back in a vehicle seat, in which the seat back has a seat occupant's back support side facing in a forward direction of the vehicle seat to supportively receive a back of an occupant on the vehicle seat and a backward side facing in a backward direction of the vehicle seat, comprising:
   a back board provided in said backward side of said vehicle seat, said back board having a forward side facing to said forward side of said seat back and a backward side corresponding to said backward side of said seat back;
   said back board being so arranged as to normally provide a substantially flat plane rigid enough to withstand a first load applied toward said backward side of the back board, thereby to allow the back board to be usable as a means for carrying load and cargo thereon, while being resiliently deformable in said backward direction of the vehicle seat by a second load applied toward said seat occupant's back support side of said seat back,
   wherein said back board includes a plurality of crevices which are normally closed to retain said back board in a substantially flat state, and
   wherein said crevices open when the backboard is resiliently deformed in said backward direction by the second load applied to said back board in said backward direction of the vehicle seat.

2. The structure of a seat back in a vehicle seat as claimed in claim 1,
   further including a biasing element in a seat back frame that biases said back board to expand flatly to provide said substantially flat plane, and
   a stopper that receives said back board and prevents movement toward said forward side of said vehicle seat.

3. The structure of a seat back in a vehicle seat as claimed in claim 2, wherein said biasing element comprises a tension coil spring connected between said seat back frame and said back board.

4. The structure of a seat back in a vehicle seat as claimed in claim 2, wherein said back board is made of a hard yet elastically deformable material, said back board having a plurality of cubic protrusions integrally formed on said backward side thereof, and wherein said plurality of crevices comprises a plurality of slits formed in said one side of said back board so as to define a plurality of crevices among said plurality of cubic protrusions, with such an arrangement that said plurality of crevices are normally closed by an elastic recovery property of said back board as well as under the biasing force of said biasing element, thereby resiliently biasing all said plurality of cubic protrusions into contact with one another, whereby said back board is normally retained in said substantially flat state, and that said crevices are openable when said second load is applied to said back board, thereby allowing the back board to be resiliently deformed in said backward direction of the vehicle seat.

5. The structure of a seat back in a vehicle seat as claimed in claim 4, wherein said plurality of cubic protrusions are arranged in an orderly way on said back board, so that said plurality of crevices are disposed in a substantially grid fashion on the back board.

6. The structure of a seat back in a vehicle seat as claimed in claim 2, wherein said back board comprises: a plurality of plate pieces pivotally connected with one another; and a plurality of stopper pieces which are integrally formed with said plurality of plate pieces, respectively, wherein said a plurality of crevices comprises a plurality of crevices each being defined between two of said plurality of stopper pieces, which in turn defines plural sets of said two of said plurality of stopper pieces in said back board, with such an arrangement that all said plurality of stopper pieces are normally biased into contact with one another under the biasing force of said biasing element, with said plurality of crevices being closed, whereby said back board is normally retained in a flat state to provide said substantially flat plane, and that, when said second load is applied to said back board, said plurality of stopper pieces are pivotally displaced away from one another to cause said plurality of crevices to open, wherein the back board is resiliently deformed in said backward direction of the vehicle seat.

7. The structure of a seat back in a vehicle seat as claimed in claim 6, wherein said plurality of plate pieces are arranged in an orderly fashion in said back board, so that said plurality of crevices are disposed in a substantially grid fashion in the back board.

8. The structure of a seat back in a vehicle seat as claimed in claim 2, wherein said back board comprises: a plurality of plate pieces; and a plurality of link pieces pivotally connected with said plurality of plate pieces, wherein said means for defining a plurality of crevices comprises a plurality of crevices defined among said plurality of plate pieces, with such an arrangement that said plurality of plate pieces are normally biased under the biasing force of said biasing element into contact with said plurality of link pieces, with said plurality of crevices being closed, so as to allow said plurality of plate pieces to be movable only when said second load is applied to said back board, whereby said back board is normally retained in a flat shape to provide said substantially flat plane, and that when said second load is applied to said back board, said plurality of plate pieces are pivotally displaced away from one another relative to said plurality of said link pieces so as to cause said plurality of crevices to open, thereby allowing the back board to be resiliently deformed in said backward direction of the vehicle seat.

9. The structure of a seat back in a vehicle seat as claimed in claim 8, wherein said plurality of plate pieces are arranged in an orderly fashion in said back board, so that said plurality of crevices are disposed in a substantially grid fashion in the back board.

10. The structure of a seat back in a vehicle seat as claimed in claim 1, wherein said back board is made of a hard yet elastically deformable material, said back board having a plurality of elastic hinge portions formed integrally in said backward side thereof, said plurality of elastic hinge portions each having a generally inverted-U-shaped cross-section, and wherein said means for defining a plurality of crevices comprises a plurality of crevices each being defined in said forward side of said back board at a point corresponding to each of said plurality of elastic hinge portions, with such an arrangement that said plurality of crevices are normally closed by an elastic recovery property of said plurality of elastic hinge portions, thereby retaining said back board in said substantially flat state, and that said plurality of crevices are openable when said second load is applied to said one side of said back board, thereby allowing the back board to be resiliently deformed in said backward direction of the vehicle seat.

11. The structure of a seat back in a vehicle seat as claimed in claim 10, wherein said plurality of elastic hinge portions are arranged in a substantially grid fashion in said one side of said back board, thereby defining said plurality of crevices in a substantially grid fashion in said another side of said back board.

12. A structure of a seat back in a vehicle seat, in which the seat back has a seat occupant's back support side facing in a forward direction of the vehicle seat to supportively receive a back of an occupant on the vehicle seat and a backward side facing in a backward direction of the vehicle seat, comprising:
   a back board provided in said backward side of said vehicle seat, said back board having a forward side facing to said forward side of said seat back and a backward side corresponding to said backward side of said seat back;
   said back board being so arranged as to normally provide a substantially flat plane rigid enough to withstand a first load applied toward said backward side of the back board, thereby to allow the back board to be usable as a means for carrying load and cargo thereon, while being resiliently deformable in said backward direction of the vehicle seat by a second load applied toward said seat occupant's back support side of said seat back;
   wherein said back board includes a plurality of crevices which are normally closed to retain said back board in a substantially flat state, and
   wherein said crevices open to form a grid when the back board is resiliently deformed in said backward direction by the second load applied to said back board in said backward direction of the vehicle seat.

* * * * *